(12) United States Patent
Boe et al.

(10) Patent No.: US 7,243,630 B2
(45) Date of Patent: Jul. 17, 2007

(54) FOOT CONTROLLED ENGINE START AND STOP SYSTEM FOR CONVERSION OF AN OFF-ROAD UTILITY VEHICLE FOR USE AS A GOLF CART

(75) Inventors: Thomas C. Boe, Cedar Falls, IA (US); Terry L. Zwart, Breezy Point, MN (US); David W. Gift, Hudson, IA (US); Thomas E. Boe, Cedar Falls, IA (US); Dennis R. LaRoque, Davenport, IA (US); Larry A. Prohaska, Cedar Falls, IA (US)

(73) Assignee: BZ Products, Inc., Cedar Falls, IA (US)

( * ) Notice: Subject to any disclaimer, the term of this patent is extended or adjusted under 35 U.S.C. 154(b) by 203 days.

(21) Appl. No.: 10/972,938

(22) Filed: Oct. 25, 2004

(65) Prior Publication Data

US 2005/0197235 A1  Sep. 8, 2005

Related U.S. Application Data

(60) Provisional application No. 60/551,168, filed on Mar. 8, 2004.

(51) Int. Cl.
*F02N 11/08* (2006.01)
(52) U.S. Cl. .................. 123/179.4; 290/38 E
(58) Field of Classification Search .......... 290/38 E, 290/38 C; 123/179.3, 179.4; 477/107
See application file for complete search history.

(56) References Cited

U.S. PATENT DOCUMENTS 3,941,204 A    3/1976  Kurii et al.
4,006,723 A *  2/1977  Schmidli ................. 123/179.4
4,104,534 A    8/1978  Hill et al.
4,209,816 A    6/1980  Hansen
4,331,880 A *  5/1982  Dittman et al. .......... 123/179.3
4,364,343 A   12/1982  Malik
4,402,286 A    9/1983  Pagel et al.
4,482,812 A   11/1984  Hori et al.
4,490,620 A   12/1984  Hansen
4,803,377 A    2/1989  Iwatani et al.

(Continued)

*Primary Examiner*—Stephen K. Cronin
*Assistant Examiner*—Arnold Castro
(74) *Attorney, Agent, or Firm*—Allan L. Harms; Wenzel & Harms P.C.

(57) ABSTRACT

A foot controlled engine start and stop system characterized by a control circuit arranged among an ignition switch, an ignition grounding circuit, a warm-up switch, a starter motor, an accelerator pedal, an alternator and an actuator to disengage the parking brake when the engine is started. The system controls automatic start and stop of the starter motor and engine by feeding back the output frequency of the alternator. When installed on an off-road utility vehicle, this system, will allow the operator to conveniently start and stop the engine by depressing or releasing the accelerator pedal. The system senses the engine speed by monitoring the frequency of the alternator output voltage and disables the starter circuit when the engine speed is at or above a level necessary to allow the engine to run without starter assistance. When the operator removes his/her foot from the accelerator pedal, the ignition circuit is grounded to stop the engine. A warm-up switch is incorporated to disable the grounding switch when the operator wishes to allow the engine to continue to run while not present.

20 Claims, 3 Drawing Sheets

U.S. PATENT DOCUMENTS

| | | |
|---|---|---|
| 4,883,028 A * | 11/1989 | Wu .......................... 123/179.3 |
| 4,901,689 A | 2/1990 | Cummins et al. |
| 4,917,061 A * | 4/1990 | Nagakura ................. 123/179.3 |
| 4,947,051 A | 8/1990 | Yamamoto et al. |
| 5,094,199 A | 3/1992 | Griffin |
| 5,287,831 A | 2/1994 | Andersen et al. |
| 5,349,931 A | 9/1994 | Gottlieb et al. |
| 5,593,367 A * | 1/1997 | Eavenson et al. ........ 123/179.4 |
| 5,617,819 A * | 4/1997 | Dery et al. .............. 123/179.3 |
| 5,742,137 A | 4/1998 | Bratton et al. |
| 5,743,227 A | 4/1998 | Jacquet et al. |
| 5,848,577 A * | 12/1998 | Sappe et al. ............. 123/179.3 |
| 5,865,263 A | 2/1999 | Yamaguchi et al. |
| 5,905,315 A | 5/1999 | Lefebvre et al. |
| 5,934,237 A | 8/1999 | Vilou |
| 6,050,233 A | 4/2000 | Vilou |
| 6,379,284 B1 | 4/2002 | Hanai et al. |

* cited by examiner

FOOT CONTROLLED ENGINE START AND STOP SYSTEM FOR CONVERSION OF AN OFF-ROAD UTILITY VEHICLE FOR USE AS A GOLF CART

CROSS-REFERENCE TO RELATED APPLICATIONS

This application claims priority from now abandoned provisional patent application entitled 8, 2004, the disclosure of which is hereby incorporated in its entirety.

FIELD OF THE INVENTION

This invention pertains to start and stop systems for off-road utility vehicles and particularly to a foot controlled engine start and stop system for conversion of an off-road utility vehicle for use as a golf cart.

BACKGROUND OF THE INVENTION

It is common practice to implement automatic start and stop systems on commercially available golf carts for the convenience of the golfer so that the user can conveniently start the golf cart engine by pressing the foot accelerator pedal and then stop the engine by removing his/her foot from the accelerator pedal. These systems heretofore have been implemented by means of a starter/generator system that allow starter operation at low speeds and generator operation at high speeds. These systems require a less efficient voltage generating system that is physically larger in size than a conventional alternator or starter motor. In addition, small engine manufacturers typically provide built in alternators and independent starters as part of the engine package.

Manufacturers of off-road utility vehicles typically use the more efficient alternator and starter systems provided by OEM engine manufacturers since the intended uses of these vehicles do not require the convenience of pedal start systems. However, it is known that some buyers of off-road utility vehicles find these units acceptable as a weekend golf cart.

A more advantageous system for a golf cart would provide for starting an alternator equipped engine with depression of the accelerator pedal and stopping the engine when the accelerator pedal is released. A kit for modifying an existing off-road utility vehicle which converts the engine of the off-road utility vehicle to a pedal start system would be useful for owners of such vehicles who desire to operate them in similar fashion to the usual golf cart.

A system for an engine which starts upon depression of the accelerator pedal is disclosed in U.S. Pat. No. 4,883,028 to Wu. The engine of Wu is only stopped by depression of the brake pedal. The device of Wu requires that the engine be equipped with a generator, a discharge trigger, a timer and a voltage regulator.

SUMMARY OF THE INVENTION

This invention provides an off-road utility vehicle owner with a convenient after market kit that can be added to the vehicle without changing the starter and alternator system of the internal combustion engine system to a starter/generator system. The kit can also be used by an off-road utility vehicle manufacturer to allow use of "off the shelf" engines with built in starter alternator systems and provide the adaptability for use of the vehicle as a golf cart.

This invention adds components as a kit to an existing off-road utility vehicle to provide a means to start and stop the engine of the vehicle by means of the accelerator pedal. The advantage of this invention over those of previous systems is that vehicles can be converted to provide a pedal start function without modification of any component of the vehicle except the wiring harness. In addition, the system of this invention provides a switch, which can be used to restore the original operation of the vehicle without removing the components of this invention. An additional feature of this invention is the ability to automatically release the park brake when the accelerator is depressed.

It is an object of this invention to provide a conversion kit which permits an off-road utility vehicle engine to be started and stopped by activation and release of the accelerator pedal of the vehicle. It is also an object of this invention to provide a means to allow an operator of an off-road utility vehicle or golf cart the ability to start the engine if it is not running and to disengage the park brake by depressing the accelerator pedal. It is a further object of this invention to stop the engine by releasing the accelerator pedal.

This invention provides a means to detect the position of the accelerator pedal so that an ignition grounding circuit can be disabled when the pedal is depressed thus allowing the engine to start or continue to run if the engine is motoring at a sufficient speed to resume operation. This detection means will also energize the starter of said engine if it is not rotating as determined by the frequency output of the engine alternator. This detection means will further energize a solenoid connected to the park brake release mechanism thus disabling the park brake when engine is started.

This invention further provides a means to stop the engine by grounding the ignition circuit when the means to detect the position of the accelerator indicates the operator has released his/her foot from the accelerator pedal. This means to stop the engine by grounding the ignition circuit can be disabled by an override switch in the event that the operator of the vehicle determines that he/she wishes to keep the engine running without depressing the accelerator pedal.

DETAILED DESCRIPTION OF THE INVENTION

Figure 1:
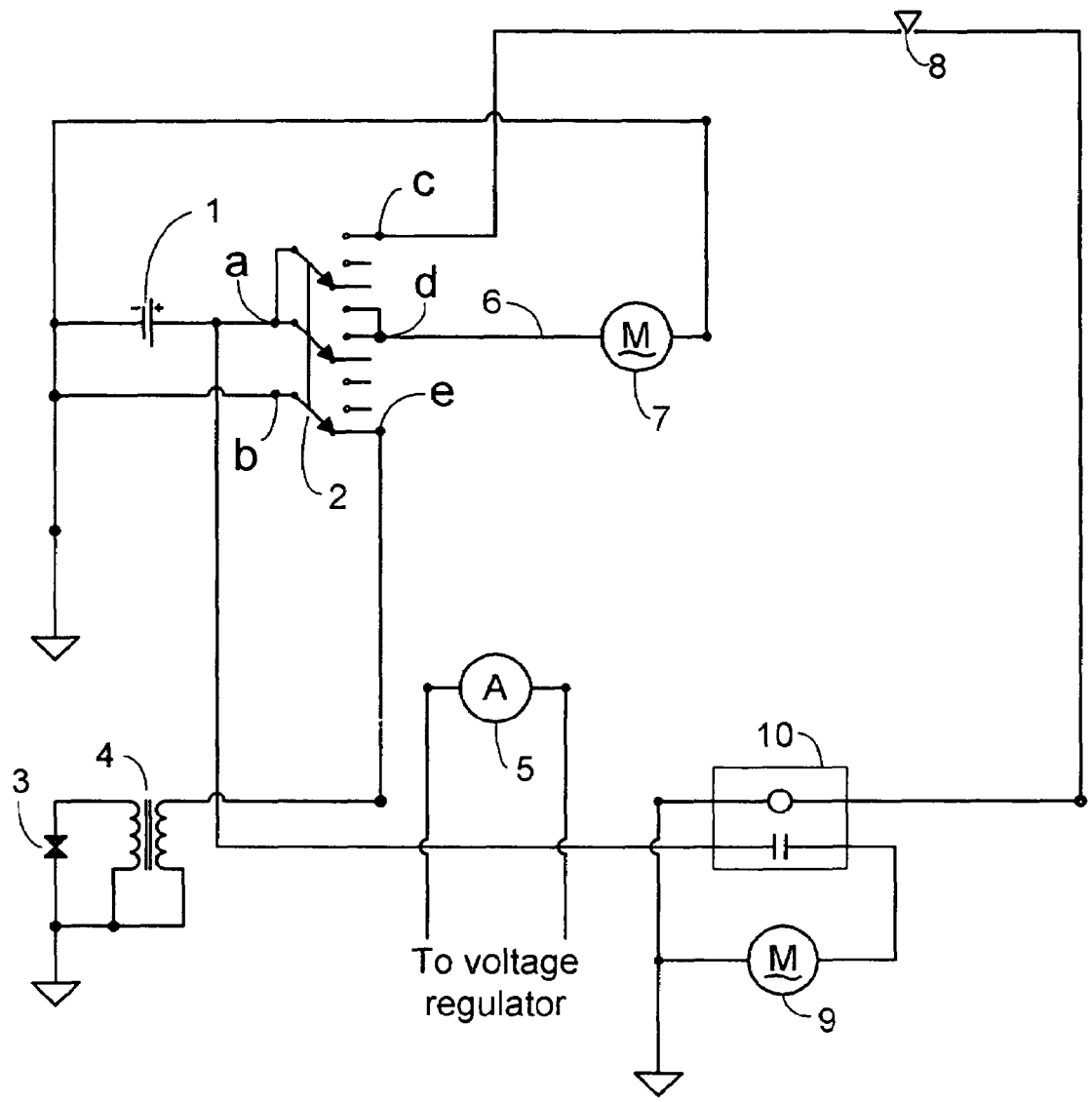
FIG. 1 is a schematic of a typical starting circuit of an off-road utility vehicle or golf cart.

FIG. 1 discloses the wiring diagram and components of a standard internal combustion engine such as is typically installed in an off-road utility vehicle. The standard engine of an off road utility vehicle includes an alternator (5) and an electrically operated starter (9). Operation of the vehicle is accomplished by use of a manual key switch (2), an accelerator pedal and a brake pedal.

The components of FIG. 1 are existing components of the vehicle on which the invention will be installed. Existing components consist of a standard lead-acid battery (1) and a three-position key switch (2) with an off position, an on position and a spring returned start position. This key switch (2) provides internal contacts which can be schematically represented by the three-pole, three-position switch shown with five connector pins labeled "a" through "e." When the key switch is in the first ("off") position, pin "b" is connected to pin "e" and all other pins are open. In the second ("run") position, pin "a" is connected to pin "d" and all other pins are open. In the third ("start") position, pin "a" is connected to both pin "c" and pin "d" with all other pins open.

Additional components within the existing circuit are the spark plug (3) and the magneto coil (4). Also included in this circuit are an alternator (5), a starter motor (9) and a starter solenoid (10). This existing circuit may include an hour meter (7) a connector wire (6) and an interlock switch (8). Interlock switch 8 serves to prevent operation of the starter motor 9 if the transmission of the vehicle is not in its neutral position. Interlock switch 8 therefore will not be in a closed position unless the transmission is moved to neutral.

Figure 2:
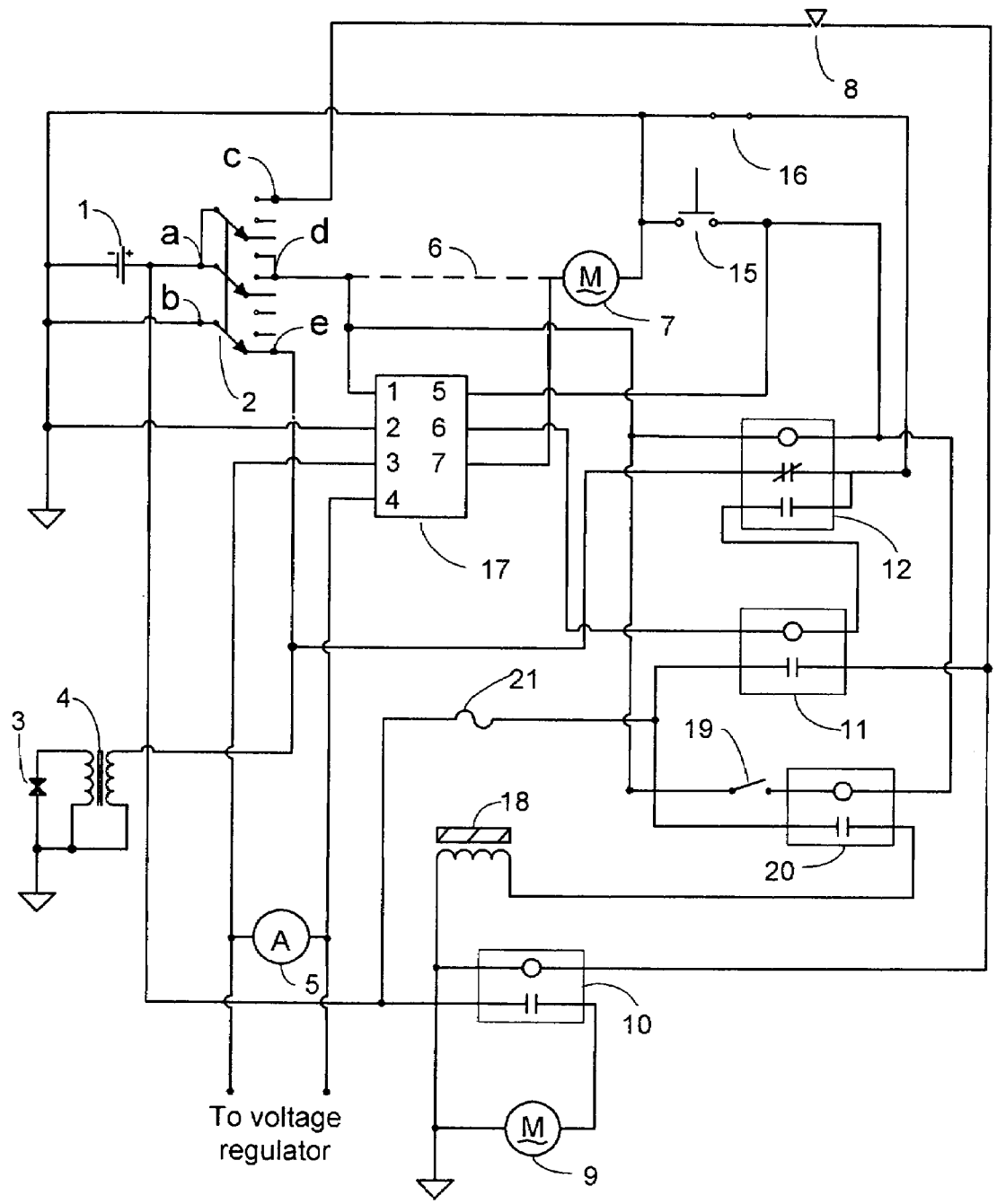
FIG. 2 is a schematic of the starting circuit of FIG. 1 modified by the addition of the components of this invention.

FIG. 2 illustrates the wiring diagram and components of a small internal combustion engine system on a typical off-road utility vehicle after modification with the present invention. The components of FIG. 2 include the existing components of FIG. 1 except for the connector wire (6), which is removed (shown here as a dotted line). In addition to these components, there is a start relay (1), whose contacts are in the open position when there is no current passing through the energizing coil and a grounding relay (12), whose contacts are in the closed position when there is no current passing through the energizing coil. There also exists a park brake solenoid (18), which is mechanically linked to a park brake release mechanism so that the park brake will be released when current is passed through the energizing coil of this solenoid. This park brake solenoid (18) is connected to a park brake relay (20) that can be enabled by a brake switch (19). The park brake solenoid 18 is protected by fuse 21.

Accelerator pedal switch (15) of FIG. 2 is mechanically linked to the foot accelerator pedal of the vehicle such that depressing the pedal will close this switch. There is a two-position warm-up switch (16) that is mounted in a convenient location so that the operator may choose between warm-up mode and normal mode. FIG. 2 shows this switch in normal mode.

Computer control module (17) provides a first output (pin 6) and a second output (pin 7) that can be either battery voltage or ground depending upon the inputs to the computer control module. The logic within this computer module (17) is programmed such that the first output (pin 6) and the second output (pin 7) are independent. The specific function of this module will be explained further as the function of this invention is described. The existing alternator (5) is connected to pins 3 and 4 of the computer module (17) to allow monitoring of the alternator frequency.

Figure 3:
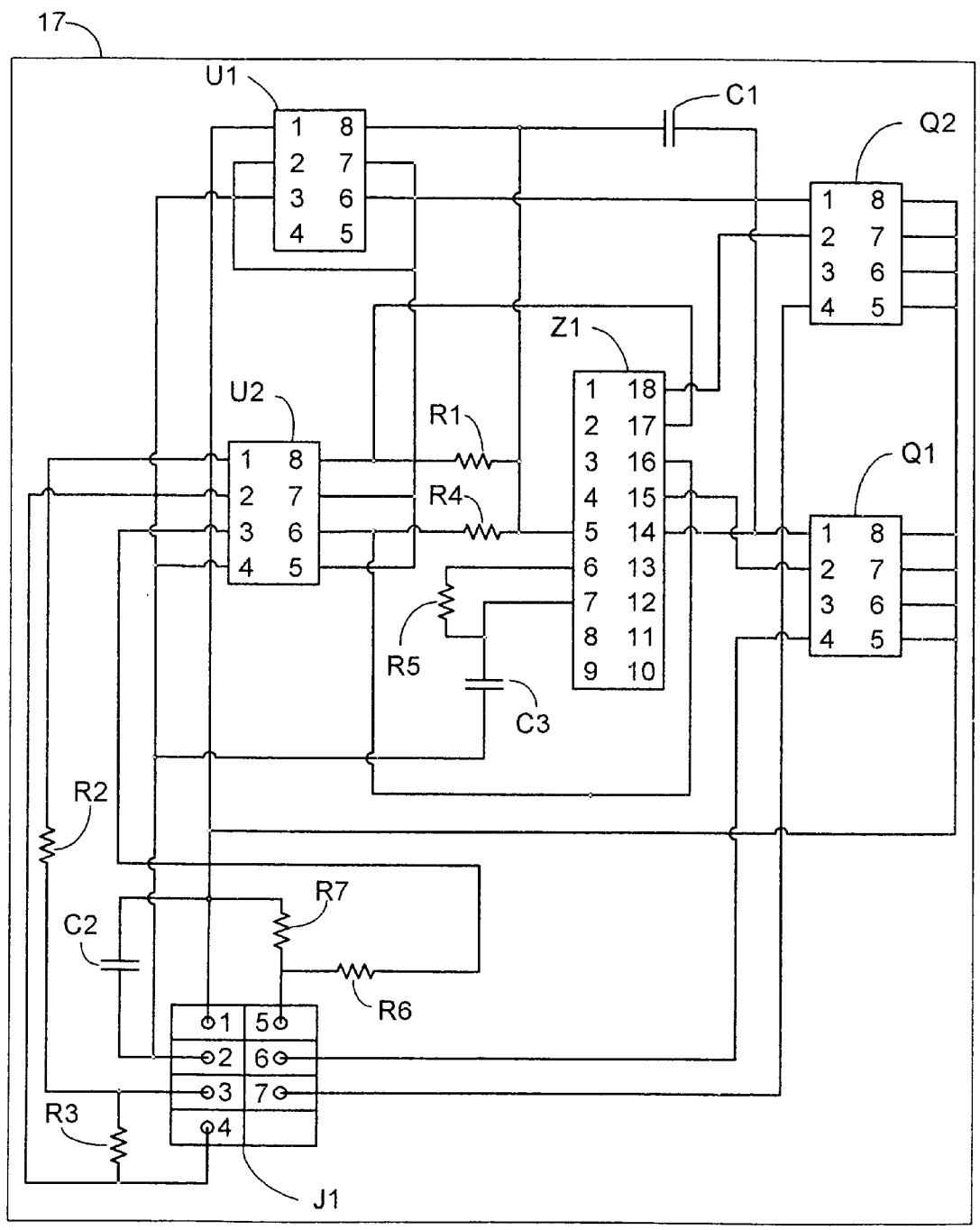
FIG. 3 is a block diagram of the computer control module (17) of FIG. 2.

FIG. 3 shows the components of the computer control module (17) of FIG. 2. Control module (17) consists of a National Instruments LM2931 5 volt voltage regulator or equivalent (U1), a NEC PS2501L-2 photo coupler or equivalent (U2), two International Rectifier LPS511G power MOSFET switches or equivalent (Q1 and Q2) and a Zilog Z86E02 One Time Programmable micro-controller or equivalent (Z1). This module also requires seven resistors (R1 to R7), three capacitors (C1, C2 and C3) and a connector (J1), which represents the interface to the computer control module (17). The resistors consist of three 200 k ohm (R2, R5 and R6), two 4.7 k ohm (R1 and R4) and one 440 ohm (R3). The capacitors consist of a 100 mf (C1), a 0.1 mf (C2) and a 56 pf (C3).

An embodiment of this invention adds components as a kit to an existing off-road utility vehicle so as to provide a means to start and stop the engine of the vehicle by means of a switch added to the accelerator pedal. In this embodiment shown in FIG. 2, the positive pole of the existing battery (1) is connected by existing wiring to the existing key switch (2) at terminal "a" and the negative pole of the battery (1) is connected by existing wiring to the existing key switch (2) at terminal "b." When the existing key switch (2) is in the "off" position as shown, terminal "b" is closed to terminal "e" which is connected by existing wiring to the output side of the magneto coil (4). This grounds the magneto coil (4) preventing voltage from reaching the spark plug (3) thereby causing the engine to stop.

When the key switch (2) is moved to the "run" position with terminal "a" coupled to terminal "d" only, the connection between terminal "b" and terminal "e" is broken, thereby removing the ground path from the magneto coil (4) through the key switch (2). However, the magneto coil (4) is now grounded by way of the grounding relay (12) through the warm-up switch (16) shown here closed in the normal operational mode. Thus the engine will not run because the spark plug (3) will not receive energy from the magneto coil (4). Opening the warm-up switch (16) will break this ground path and thus allow the engine to run. The "run" position of the key switch (2) also causes terminal "a" to connect to terminal "d" allowing electrical potential at pin 1 of the computer module (17), at the coil of grounding relay (12), at the contacts of the park brake relay (20) and at the normally open brake switch (19). The existing wiring (6) shown by a dotted line is disconnected from the hour meter (7) to prevent hour meter operation with the key switch (2) in the run position. With electrical potential at the coil of the grounding relay (12), closing the accelerator pedal switch (15) will cause current to flow through the coil of grounding relay (12) thereby opening the contacts of grounding relay (12) and disrupting the ground to the magneto coil (4) thereby allowing the engine to run even with the warm-up switch (16) in closed (normal) position.

It can be seen that when this "kit" is installed, the engine may be stopped by placing the key switch (2) in the "off" position since the magneto coil (4) is grounded by means of the connection between terminals "b" and "e" of the key switch (2).

However, with the "kit" installed and the key switch (2) in the "run" position, the magneto coil (4) will be connected to ground by way of the nonenergized normally closed grounding relay (12) and the normally closed warm-up switch (16), thus preventing the engine from running.

When the operator depresses the accelerator pedal, the accelerator pedal switch (15) will close thus allowing current to flow from the positive pole of the battery (1) to connector "a" of the key switch (2) out of connector "d" to the coil of the grounding relay (12) to the now closed contacts of accelerator pedal switch (15) and then to the negative pole of the battery (1), thereby allowing the contacts of the grounding relay (12) to open and thus disconnecting the magneto coil (4) from ground. This will now allow the engine to run.

The action of closing the accelerator pedal switch (15) when the key switch (2) is in the run position will also connect the command input (pin 5) of the computer control module (17) to ground thus causing 12 volts to be applied to the first output (pin 6) of the command module (17). When this 12-volt signal is present, current will flow through the coil of the start relay (11) to ground via the warm-up switch (16). This current flow will cause the switch of the start relay (11) to close thus applying voltage from the positive terminal of the battery (1) via the fuse (21), through the contacts of the start relay (11) to the existing starter solenoid (10). Such action will engage the starter motor and start the engine since the magneto coil (4) is no longer connected to ground.

It should be further noted that when the accelerator pedal switch (15) is closed, the coil of park brake relay (20) will likewise be connected to ground. If the brake switch (19) is closed, current will flow through the coil of the park brake relay (20) allowing electrical power to flow to the park brake solenoid (18) thus disengaging the park brake.

When the computer control module (17) senses sufficiently high frequency from the alternator (5) to indicate that the engine can run without starter assistance, the first output (pin 6) of the computer control module (17) will be pulled to ground by the logic within the computer control module (17). This will disable the start relay (11) thus disconnecting power from the starter solenoid (10). When this sufficiently high frequency from the alternator (5) is detected, the computer control module (17) will further cause 12 volts to be applied to the second output (pin 7) thereby causing the hour meter (7) to count hours of operation. In practice it is found that a frequency of greater than about 90 Hz at the alternator 5 corresponds with the engine turning at about 500 RPM which is indicative that the engine is running and that the starter should not continue to be energized.

When the operator removes his foot from the accelerator pedal, the accelerator pedal switch (15) will open thereby disconnecting the current flow through the coil of the grounding relay (12) thus closing the contacts of said grounding relay (12) and causing the magneto coil (4) to again be grounded via the grounding relay (12) and the warm-up switch (16). This action will cause the engine to come to a stop.

The computer control module (17) will be programmed such that once a sufficiently high frequency ($\geq$ about 90 Hz) is detected from the alternator (5), the first output (pin 6) of the computer control module (17) will remain at ground until a sufficiently low frequency ($\leq$ about 10 Hz) is detected from the alternator (5) so that start relay (11) will keep the power from the starter solenoid (10) disconnected until the engine comes to a full stop. This logic will thus prevent engagement of the starter solenoid (10) from occurring if the operator depresses the accelerator pedal before the engine stops rotating from a previous start cycle.

It is known that golf carts can require some engine warm-up when operating in cool weather. To accomplish this, the warm-up switch (16) can be moved to the open position thus opening the grounding path from the magneto coil (4) through the grounding relay (12) even though the accelerator pedal switch (15) is open. When this warm-up switch (16) is in the open (warm-up) position, the start relay (11) will also be disabled. This warm-up mode will therefore require the engine start to be accomplished by use of the start position of the key Switch (2), that is with terminal "a" coupled to terminal "c" and to terminal "d" and with terminal "b" open.

With the warm-up switch 16 open (in "idle" position) and with key switch (2) in the "start" position, there is no connection between terminal "b" and terminal "e" so magneto coil 4 is not grounded and spark plug (3) will receive energy from the magneto coil 4 allowing the engine to run as long as the ground path through the grounding relay (12) or the warm-up switch (16) does not exist. In the "PStart" position of the key switch (2) terminal "a" is coupled to terminal "c" allowing electrical energy to flow to the starter solenoid (10) through existing interlock switch (8) which is standard on the vehicle engine. Flow of electrical energy causes the contact of starter solenoid (10) to close allowing current from the positive pole of the battery (1) to flow through existing wiring to the starter motor (9). By this means the starter motor (9) will cause the engine to start and release of the key switch 2 will cause it to return to the "ON" position, stopping the starter motor 9 but allowing the engine to run as it would before modification by this invention. Therefore, the present invention provides a single switch means for easily returning the engine to its original operation when that mode of operation is desired.

Many variations of the invention will be apparent to those skilled in the art. It is therefore to be understood, that within the scope of the appended claims, the invention may be practiced other than as specifically described.

We claim:

1. A logic circuit for a starting system for a vehicle comprising:
    a switch connected to an accelerator pedal of an engine of the vehicle,
    a computer control module coupled to an alternator of the vehicle;
    a battery to store electrical power generated by the alternator;
    a first relay connected between ground and a magneto coil of the engine of the vehicle;
    means to close contacts of the first relay to ground the magneto coil to disable the engine when the accelerator pedal of the engine is in a rest position,
    the computer control module preventing commencement of operation of a starter of the engine when the alternator is rotating.

2. The logic circuit of claim 1 further comprising:
    means to open the contacts of the first relay to allow the engine to run when the accelerator pedal is moved away from its rest position.

3. The logic circuit of claim 2 further comprising:
    a second relay connected between the battery and an existing starter circuit of the vehicle; and
    means to close contacts of the second relay to provide electrical power to the starter circuit when the engine is not rotating and the accelerator pedal is moved away from its rest position.

4. The logic circuit of claim 3 further comprising:
    a solenoid actuated brake release mechanism; and
    means to close the contacts of the second relay to provide power to the solenoid actuated brake release mechanism when the engine is not rotating and the accelerator pedal is moved away from its rest position.

5. The logic circuit of claim 1 further comprising:
    the computer control module coupled to an output terminal of the alternator,
    an output frequency present at the output terminal of the alternator when the alternator is rotating,
    the computer control module disengaging the starter from the battery when a first preselected frequency is reached,
    the computer control module further preventing operation of the starter if the output frequency of the alternator is greater than an second preselected frequency.

6. The logic circuit of claim 5 wherein
    the first preselected frequency is greater than about ninety Hz.

7. The logic circuit of claim 6 wherein
    the second preselected frequency is greater than about ten Hz.

8. A motorized off road vehicle comprising
    an internal combustion engine,
    a battery,
    a magneto,
    an alternator,
    a starter,
    an accelerator pedal,
    a first manual switch including an off position, a run position, and a start position,
    a first control circuit coupled to the starter and the magneto, the first control circuit selectively enabling the starter to operate when the accelerator pedal is moved from its rest position and the first manual switch is in the run position or the start position thereof, the magneto coupled to ground when the accelerator pedal is released, the first control circuit detecting rotation of the alternator, the first control circuit preventing initiation of operation of the starter if the alternator is rotating.

9. The motorized off road vehicle of claim 8 wherein the first control circuit comprises a control module coupled to an output of the alternator, the control module detecting an output frequency of the alternator, the control module preventing commencement of operation of the starter when an output frequency above a preselected frequency is detected.

10. In an off road vehicle having an internal combustion engine, an alternator, a starter motor, a battery, a brake, a magneto, an accelerator pedal, a key switch having an off position, a run position, and a start position; the starter motor operative only when the key switch is moved to the start position, control circuitry for selectively operating the vehicle as a pedal start vehicle wherein the starter motor operates when the accelerator pedal is depressed, and the engine stops when the accelerator pedal returns to a rest position thereof, the control circuitry including first circuit structure coupled to the magneto and to the starter motor, the first circuit structure responsive to movement of the accelerator pedal from a rest position to enable the engine to run and to energize the starter motor, and further to ground the magneto and deenergize the starter motor when the accelerator pedal returns to the rest position, a switch to selectively disable the first circuit structure and enable the vehicle to operate as a key start vehicle.

11. The invention as set forth in claim 10 wherein the first circuit structure is coupled to the alternator to sense an output frequency of the alternator, the first circuit structure preventing initiation of operation of the starter motor if greater than a preselected frequency is sensed.

12. The invention as set forth in claim 10 wherein the first circuit structure comprises a first switch coupled to the accelerator pedal wherein the first switch closes when the accelerator pedal is moved from a rest position thereof, a first relay including first contacts coupling the magneto to ground when the first normally closed relay is deenergized, the first relay further including second contacts coupling ground to a second relay when the first relay is energized, the first relay energized when the first switch is closed and the key switch is in the run position, a second relay having normally open contacts, the second relay coupling battery power to the starter motor when the second relay is energized, a control module coupled to the alternator to detect a frequency output thereof, the control module coupled to the second relay, the control module preventing the normally open contacts of the second relay from closing when the control module detects an alternator output frequency greater than about ten Hz.

13. In an off road vehicle having an internal combustion engine, an alternator, a starter motor, a battery, a brake, a magneto, an accelerator pedal, a key switch having an off position, a run position, and a start position, the starter motor being operative only when the key switch is moved to the start position, control circuitry for selectively operating the vehicle as a pedal start vehicle wherein the starter motor operates when the accelerator pedal is depressed, and the engine stops when the accelerator pedal returns to a rest position thereof, the control circuitry including, first circuit structure coupled to the magneto and to the starter motor, the first circuit structure responsive to movement of the accelerator pedal away from a rest position thereof to enable the engine to run and to energize the starter motor, the first circuit structure further grounding the magneto and deenergizing the starter motor when the accelerator pedal returns to the rest position, the first circuit structure further preventing initiation of operation of the starter motor when the engine is rotating.

14. The invention as set forth in claim 13 wherein second circuit structure is coupled to the first circuit structure to energize a brake release solenoid when the starter motor is energized.

15. The invention as set forth in claim 13 wherein the first circuit structure is coupled to the alternator to sense the output frequency of the alternator, the first circuit structure causing the starter motor to be deenergized if a preselected frequency is sensed.

16. The invention as set forth in claim 13 wherein the first circuit structure prevents operation of the starter motor when an output frequency of the alternator exceeds approximately ten Hz.

17. The invention as set forth in claim 13 wherein a control module is coupled to the alternator to detect a frequency output thereof, the control module preventing commencement of operation of the starter motor when the frequency output of the alternator exceeds approximately ten Hz.

18. The invention as set forth in claim 13 wherein the first circuit structure comprises;

a first switch coupled to the accelerator pedal wherein the first switch closes when the accelerator pedal is moved from a rest position thereof, a first relay including first contacts coupling the magneto to ground when the first relay is deenergized, the first relay further including second contacts coupling ground to a second relay when the first relay is energized, the first relay energized when the first switch is closed and the key switch is in the run position, the second relay coupling battery power to the starter motor when the second relay is energized.

19. The invention as set forth in claim 18 wherein the first circuit structure comprises a control module coupled to the alternator to detect a frequency output thereof, the control module coupled to the second relay, the control module preventing contacts of the second relay from closing when the control module detects an alternator output frequency greater than about ten Hz.

20. The invention as set forth in claim 19 wherein the control module causes contacts of the second relay to open when the control module detects an alternator output frequency greater than about ninety Hz.

* * * * *